(12) United States Patent
Beardsley et al.

(10) Patent No.: US 6,202,095 B1
(45) Date of Patent: Mar. 13, 2001

(54) DEFINING CHARACTERISTICS BETWEEN PROCESSING SYSTEMS

(75) Inventors: Brent Cameron Beardsley, Tucson, AZ (US); John Thomas Flynn; Michael Aloysius Paulsen, both of Morgan Hill, CA (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/167,605

(22) Filed: Oct. 7, 1998

(51) Int. Cl.$^7$ ........................................ G06F 15/16
(52) U.S. Cl. ............................ 709/227; 709/228; 709/201
(58) Field of Search ....................... 709/224, 245, 709/202, 227, 228, 220, 201; 340/825.14, 825.15; 370/431

(56) References Cited

U.S. PATENT DOCUMENTS

| | | |
|---|---|---|
| 4,149,242 | 4/1979 | Pirz . |
| 4,402,046 * | 8/1983 | Cox et al. ............................ 364/200 |
| 4,408,273 | 10/1983 | Plow . |
| 4,453,211 | 6/1984 | Askinazi et al. . |
| 4,829,422 * | 5/1989 | Morton et al. ...................... 364/200 |
| 5,097,410 | 3/1992 | Hester et al. . |
| 5,197,069 | 3/1993 | Cook et al. . |
| 5,202,998 * | 4/1993 | Yanes .................................. 395/725 |
| 5,261,072 | 11/1993 | Siegel . |
| 5,274,773 | 12/1993 | Squires et al. . |
| 5,276,826 | 1/1994 | Rau et al. . |
| 5,333,315 | 7/1994 | Saether et al. . |
| 5,386,512 | 1/1995 | Crisman et al. . |
| 5,392,443 | 2/1995 | Sakakibara et al. . |
| 5,404,474 | 4/1995 | Crook et al. . |
| 5,467,348 * | 11/1995 | Fujii et al. .......................... 370/468 |
| 5,471,609 * | 11/1995 | Yudenfriend et al. ................... 714/4 |
| 5,488,707 | 1/1996 | Phillips et al. . |
| 5,497,460 | 3/1996 | Bailey et al. . |
| 5,528,764 | 6/1996 | Heil . |
| 5,530,897 | 6/1996 | Meritt . |
| 5,548,782 | 8/1996 | Michael et al. . |
| 5,553,285 | 9/1996 | Krakauer et al. . |
| 5,566,352 | 10/1996 | Wishneusky . |
| 5,568,629 | 10/1996 | Gentry et al. . |
| 5,581,768 | 12/1996 | Garney et al. . |

(List continued on next page.)

FOREIGN PATENT DOCUMENTS

| | | |
|---|---|---|
| 58-056058 | 4/1983 | (JP) . |
| 2082378 | 3/1990 | (JP) . |

OTHER PUBLICATIONS

IBM 3990/9390 Storage Control; Document No. GA32–0274–04; Fifth Edition, Oct. 1996 (selected portions of Chapter 2).

IBM 3990 Storage Control Reference (Models 1,2, and 3); Document No. GA32–0099–06, Seventh Edition, Oct., 1994 (selected portions of chapters 1,2, and 4).

(List continued on next page.)

*Primary Examiner*—Mark Rinehart
*Assistant Examiner*—Jason D. Cardone
(74) *Attorney, Agent, or Firm*—David W. Victor; Konrad Raynes & Victor

(57) ABSTRACT

Disclosed is a system for indicating system capabilities. A first processing unit, such as a control unit, receives a command from a second processing unit, such as a host system, indicating capabilities of the first processing unit. The first processing unit determines common capabilities indicated in the command that are also available in the first processing unit and indicates in a data structure, such as a bitmap data structure, the common capabilities. The first processing unit then signals the second processing unit of the change in system status.

21 Claims, 4 Drawing Sheets

U.S. PATENT DOCUMENTS

| | | | |
|---|---|---|---|
| 5,596,723 | | 1/1997 | Romohr . |
| 5,603,029 | | 2/1997 | Aman et al. . |
| 5,608,893 | * | 3/1997 | Slingwine et al. .................... 711/141 |
| 5,634,124 | | 5/1997 | Khoyi et al. . |
| 5,640,591 | | 6/1997 | Rosenthal et al. . |
| 5,644,715 | | 7/1997 | Baugher . |
| 5,664,152 | | 9/1997 | Ezzett . |
| 5,680,580 | | 10/1997 | Beardsley et al. . |
| 5,751,985 | * | 5/1998 | Shen et al. ............................ 712/218 |
| 5,859,979 | * | 1/1999 | Tung et al. ........................... 709/228 |
| 5,860,138 | | 11/1999 | Engebretsen et al. . |
| 5,884,307 | * | 3/1999 | Depledge et al. ........................ 707/7 |
| 5,892,761 | * | 4/1999 | Stracke, Jr. ............................ 370/395 |
| 5,999,514 | * | 12/1999 | Kato ...................................... 370/231 |
| 6,125,398 | * | 9/2000 | Mirashrafi et al. ................... 709/236 |

OTHER PUBLICATIONS

IBM Technical Disclosure Bulletin Deleting Objects On Worm Media, vol. 32, No. 7, Dec. 1989.

IBM Technical Disclosure Bulletin Separate Write/Read Logical Paths To Optimize Library Network File System Data Rates, vol. 37, No. 09, Sep. 1994.

USSN 09/168,017, filed Oct. 7, 1998 (Atty. Dkt. No. TU9–958–018 18.26).

USSN 09/167,782, filed Oct. 7, 1998 (Atty. Dkt. No. TU9–98–019 18.27).

USSN 09/167,860, filed Oct. 7, 1998 (Atty. Dkt. No. TU9–98–025 18.32).

USSN 09/167,603, filed Oct. 7, 1998 (Atty. Dkt. No. TU9–98–061 18.39).

Borkar et al., "iWarp: An Integrated Solution to High–Speed Parallel Computing", IEEE Supercomuting '88, pp. 330–339 Nov. 1988.*

Rockefeller et al., "Adaptive Transmission Relaying Concepts for Improved Proformance", IEEE Transactions on Power Delivery, pp. 1446–1458 Oct. 1988.*

Wileden et al., "Specification Level Interoperability", International Conference on Software Eng., pp. 74–85 Mar. 1990.*

Venkataraman, Raman, "Designing SONET/ATM Layer Processing ASICs Using Embedded Approach", IEEE Computers and Communications, pp. 437–443 Mar. 1995.*

* cited by examiner

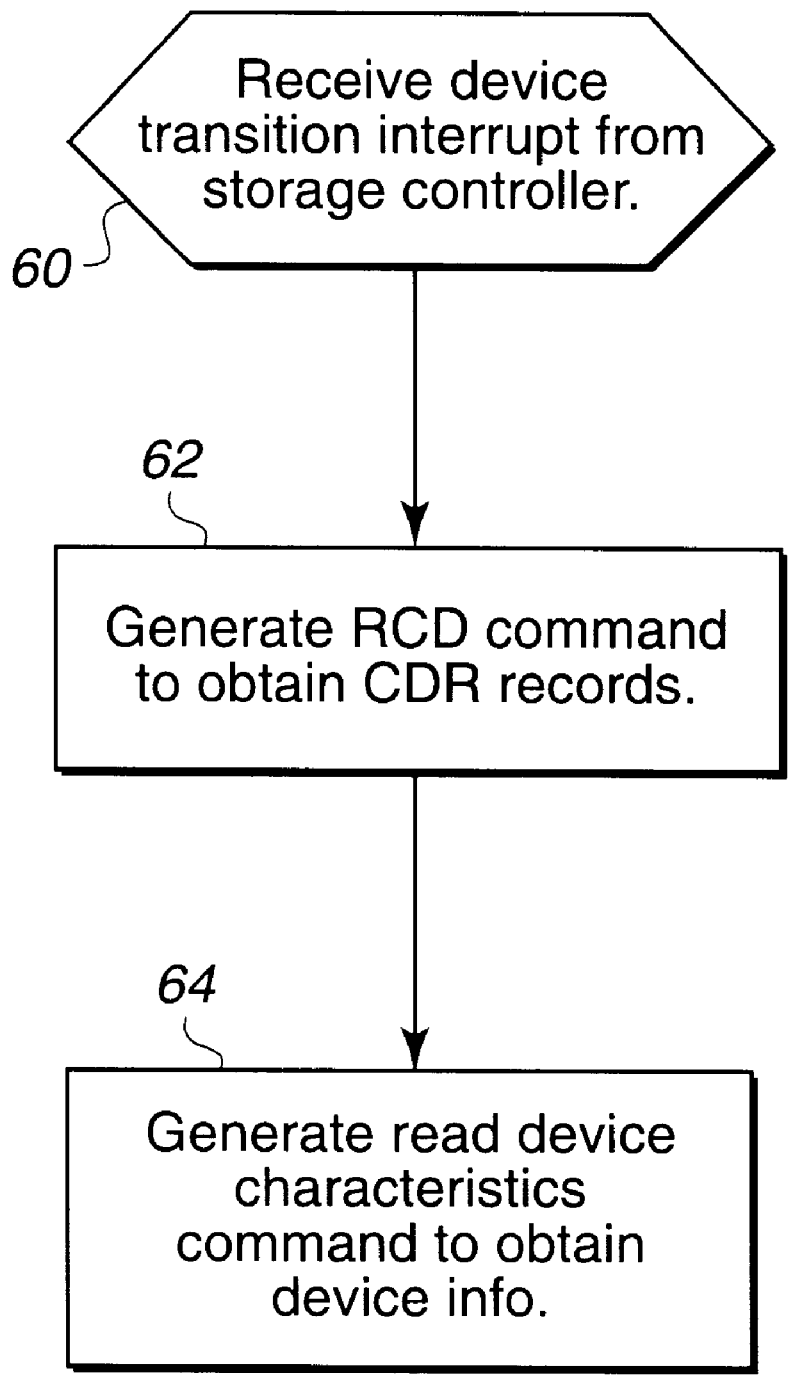

DEFINING CHARACTERISTICS BETWEEN PROCESSING SYSTEMS

CROSS-REFERENCE TO RELATED APPLICATIONS

This application is related to the co-pending and commonly-assigned patent application entitled "Method And System For Dynamically Assigning Addresses To An Input/Output Device," by Brent C. Beardsley, Allan S. Merritt, Michael A. Paulsen, and Harry M. Yudenfriend, Ser. No. 09/167,782 which applications was filed on the same date herewith, and which application is incorporated herein by reference in its entirety.

BACKGROUND OF THE INVENTION

1. Field of the Invention

The present invention relates to a method and system for indicating system characteristics of one processing system to another processing system.

2. Description of the Related Art

FIG. 1 illustrates a hardware environment of a channel subsystem 2 included in a host system 4 providing communication between CPUs 6a, b and I/O devices 10a, b, c. A storage controller 8 controls access to the I/O devices 10a, b, c. The host system 4 communicates with the storage controller 8 via the channel subsystem 2 and subchannels 14a, b, c therein. The host system 4 includes CPUs 6a, b that contain the sequencing and processing facilities for instruction execution, interruption action, timing functions, initial program loading, and other machine-related functions. The I/O devices 10a, b, c may be comprised of printers, magnetic-tape units, direct-access-storage devices (DASDs), displays, keyboards, communications controllers, teleprocessing devices, and sensor-based equipment. The storage controller 8 regulates and controls data transfers to the I/O devices 10a, b, c. The storage controller 8 function may be a separate stand alone machine, such as the IBM 3990 Storage Controller, or housed within the I/O device 10a, b, c or within the host system 4. In certain systems, the host system 4 may view the storage controller 8 as a multitude of separate control unit images or logical subsystems (LSSs), wherein each control unit image provides access to one or more I/O devices 10a, b, c. The storage controller 8 may include multiple control unit images, i.e., LSSs, each of which may address up to 256 I/O devices.

The CPUs 6a, b and the channel subsystem 2 may access a main storage 12. Programs and data maintained in the I/O devices 10a, b, c such as storage drives, must be loaded into the main storage 12 before the CPUs 6a, b can process such programs and data. The main storage 12 may include a fast access buffer or cache. I/O operations involve the transfer of data between the main storage 12 and the I/O devices 10a, b, c. The channel subsystem 2 directs the flow of data between the storage controller 8 and the main storage 12. The channel subsystem 2 relieves the CPUs 6a, b of handling I/O operations and permits the CPUs 6a, b to devote processing cycles to other operations while the channel subsystem 2 concurrently handles data transfers. In typical implementations, the CPUs 6a, b, the main storage 12, and the channel subsystem 2 are all located within a single host 4 that is attached to a single storage controller 8, such as the IBM 3990 Storage Controller.

Channel paths 13 provide data communication between the channel subsystem 2 and the storage controller 8. The channel paths 13 may employ a parallel-transmission protocol or a serial-transmission protocol. The storage controller 8 includes control logic to physically access the I/O devices 10a, b, c and control data transfer. In preferred embodiments, multiple channel paths 13 may be dedicated for communication with a particular I/O device 10a, b, c.

A subchannel 14a, b, c is dedicated to each I/O device 10a, b, c accessible to the channel subsystem 2, i.e., there is a one-to-one relationship between subchannels 14a, b, c and I/O devices 10a, b, c. Each subchannel 14a, b, c consists of internal storage and includes information relating the I/O devices 10a, b, c to the channel subsystem 2. The channel subsystem 2 uses the information in the subchannels 14a, b, c to access the I/O devices 10a, b, c. The subchannels 14a, b, c are assigned to the I/O devices 10a, b, c at initialization. The subchannels 14a, b, c maintain information such as the channel command word (CCW), channel-path identifier, device number, etc., concerning operations initiated with respect to the I/O device 10a, b, c represented by the subchannel 14a, b, c. I/O devices 10a, b, c that are attached to the channel subsystem 2 by multiple channel paths 13 may be accessed using any of the available channel paths 13. An I/O device 10a, b, c is addressed by channel-path identifiers (CHPIDs) identifying the path to a device, subchannel numbers identifying the subchannel 14a, b, c associated with the device, and a device number uniquely identifying the I/O device 10a, b, c to the host system 4. The IBM S/390 operating system allows for dynamic-reconnection, wherein the storage controller 8 may select any channel path 13 leading to the host system 4 when logically reconnecting to the channel subsystem 2. A description of these commands is provided in the IBM publication, "IBM 3990/9390 Storage Control Reference," IBM Document no. GA32-0274-04 (Copyright IBM, 1994, 1996), which publication is incorporated herein by reference in its entirety.

In the IBM mainframe environment, the channel paths 13 from a host system 4 to the storage controller 8 are identified to the storage controller 8 by a Set Path Group Identifier command. This command assigns a path group ID to one or more channel paths that provide communication between a host system 4 and one of the I/O devices 10a, b, c. Thus, a subchannel 14a, b, c is related to a path group ID, which relates the paths to an I/O device 10a, b, c associated with the subchannel 14a, b, c. The path group IDs define the paths associated with a host 4 for the purpose of device reservation.

In prior art systems, it is possible for a host 4 to concurrently run two or more operating systems—a host operating system and a guest operating system which runs on top of the host operating For instance, the IBM VM/ESA® operating system supports running a guest system with a different operating system date/time than the host VM/ESA system. This enables testing of MVS®, VM, and VSE/ESA™ systems with different application programs without affecting the host VM/ESA system. VM/ESA and MVS are registered trademarks of IBM and VM/ESA is a trademark of IBM. However, one problem that may arise in such a system is that the guest operating system may have enhanced function capability beyond the capabilities of the host operating system. In such case, the host operating system would not be able to understand certain commands and operations from the storage controller 8 when the storage controller 8 is interacting with the guest operating system in the enhanced capability modes.

In prior art systems, the host may issue commands to inhibit the enhanced operations. For instance, in the IBM mainframe environment, the host system 4 may issue a Set Special Intercept Condition which causes the host operating system to monitor communications from the storage controller 8 to the guest operating system. Under control of the Set Special Intercept Condition, the host 4 monitors commands on a path group. The host operating system may then intercept certain specified commands from the storage controller 8 to the guest operating system on a path associated with the path group ID being monitored and prevent such commands from reaching the guest operating systems. These commands and intercept methods are described in IBM publication "Storage Subsystem Library: IBM 3990 Storage Control Reference (Models 1, 2, and 3)", IBM document no. GA32-0099-06, (IBM Copyright 1988, 1994), which publication is incorporated herein by reference in its entirety.

Alternatively, to prevent a storage controller 8 implementing operations incompatible with the host system 4 capabilities, a systems administrator may selectively disable certain functions in the storage controller 8 that the host operating system cannot handle.

There is a need in the art for an improved method and system of determining and enabling system capabilities.

SUMMARY OF THE PREFERRED EMBODIMENTS

To overcome the limitations in the prior art described above, the present invention discloses a method and system for indicating system capabilities. A first processing unit receives a command from a second processing unit indicating capabilities of the first processing unit. The first processing unit determines common capabilities indicated in the command that are also available in the first processing unit and indicates in a data structure the common capabilities. The first processing unit then signals the second processing unit.

In further embodiments, a first processing unit transmits a first command indicating system capabilities to a second processing unit. The second processing unit determines common system capabilities between the first and second processing units. The first processing unit receives an interrupt from the second processing unit and transmits a second command to the second processing unit requesting system settings. The second processing unit receives system settings information from the second processing unit indicating the common system capabilities between the first processing unit and the second processing unit.

In yet further embodiments, a guest operating system runs within a host operating system. The guest operating system transmits a command indicating system capabilities of the guest operating system to a control unit. The host operating system determines whether a transmission from the guest operating system is the command indicating system capabilities. The host operating system inhibits the command transmitted from the guest operating system indicating system capabilities from reaching the control unit.

Prior art systems which use an intercept command to inhibit certain operations impose significant processing burdens on the host operating system because the host must continually monitor the channel paths for the commands to inhibit. Further, the task of having a systems administrator selectively disable certain capabilities becomes exceedingly complex and difficult to manage as the number of functions and commands proliferate. Still further, in a mixed environment of different host and guest operating systems, overall system capabilities are reduced to the lowest common denominator of system capabilities. Thus, when native VM and MVS systems are running, all systems are reduced to the functions compatible with the VM operating system, which may not include certain functions MVS offers.

To address these shortcomings in the prior art, preferred embodiments provide a mechanism for a host system to indicate to a storage controller system capabilities and allow the storage controller to determine capabilities supported by both the host and control unit. The control unit would then provide such information on the common characteristics to the host system so the host system may initialize its configuration to activate those common characteristics. In this way, only common characteristics are activated between host systems and storage controllers.

BRIEF DESCRIPTION OF THE FIGURES

Referring now to the drawings in which like reference numbers represent corresponding parts throughout:

FIG. 4 illustrates logic of processing an interrupt from a control unit indicating a change in system status in accordance with preferred embodiments of the present invention.

DETAILED DESCRIPTION OF THE PREFERRED EMBODIMENTS

In the following description, reference is made to the accompanying drawings which form a part hereof. The drawings provide illustration of several embodiments of the present invention. It is understood that other embodiments may be utilized and structural and operational changes may be made without departing from the scope of the present invention.

Hardware and Software Environment

Figure 1:
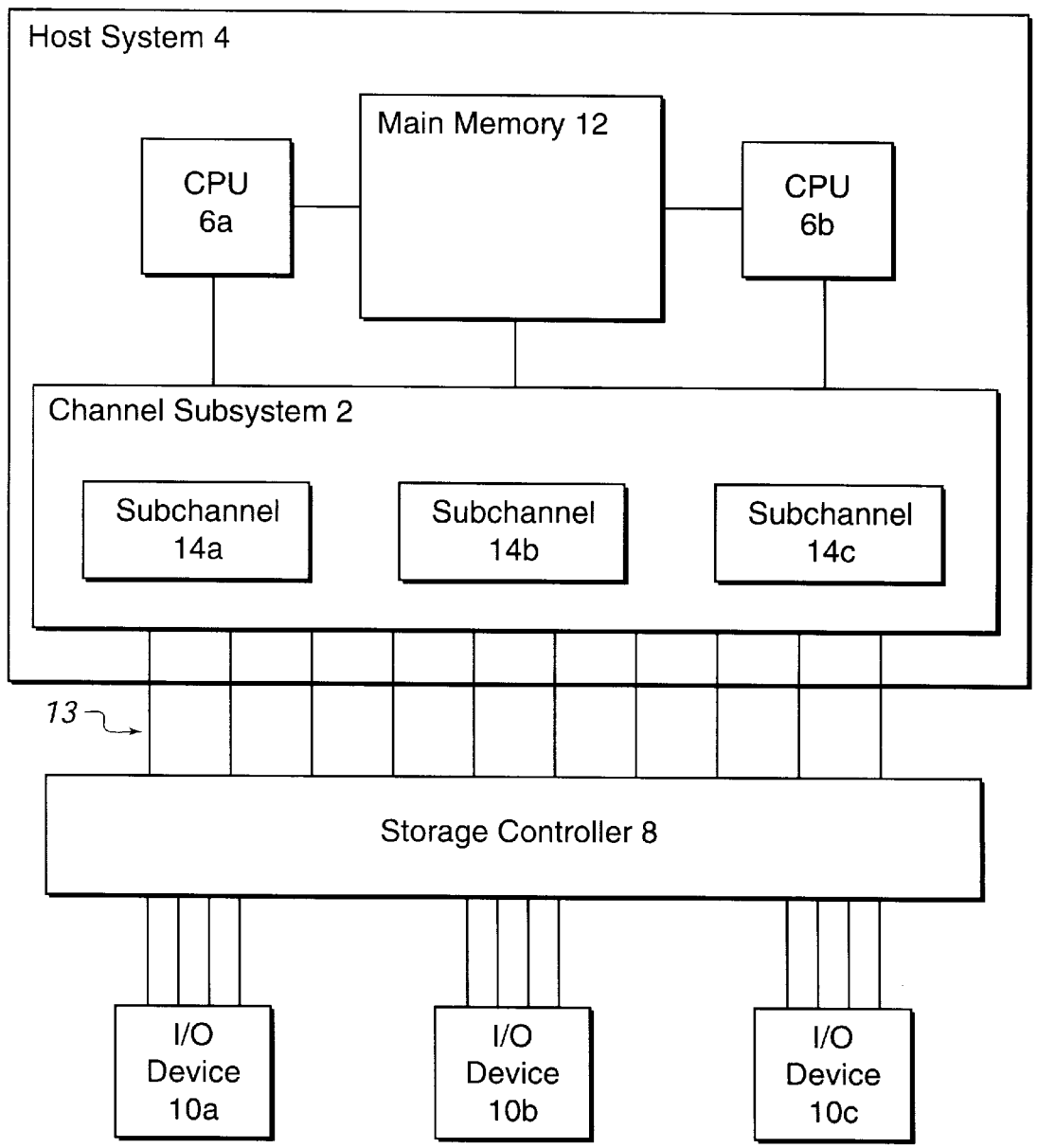
FIG. 1 illustrates a prior art system for handling I/O operations.
Figure 2:
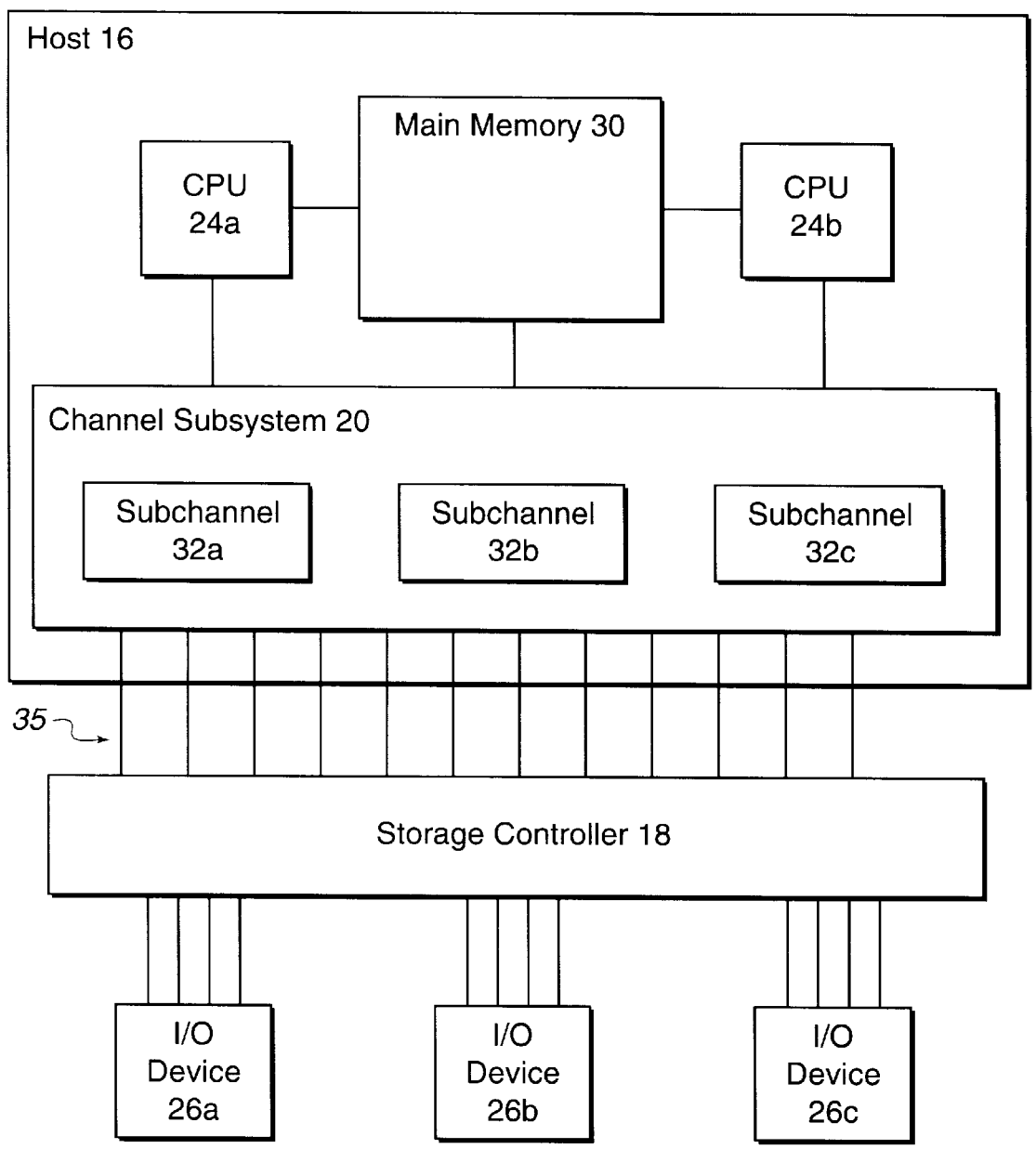
FIG. 2 illustrates a preferred hardware and software structure in which preferred embodiments of the present invention are implemented.

FIG. 2 illustrates a preferred hardware and software environment in which preferred embodiments are implemented. A host system 16 is in communication with a storage controller 18. The host system 16 views the storage controller 18 as a channel subsystem 20 that interfaces the CPUs 24a, b in the host 16 with I/O devices 26a, b, c. The host may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. As discussed, the storage controller 18 may include multiple logical subsystems (LSSs), i.e., control unit images, wherein each LSS may address up to 256 devices.

In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18. In preferred embodiments, the structure of the storage controller 18 and interface between the storage controller 18 and host system 16 may be the storage controller 18 structure described in the following U.S. patent applications assigned to IBM: "Failover System for a Multiprocessor Storage Controller," to Brent C. Beardsley, Matt Kalos, Ronald R. Knowlden, Ser. No. 09/026,622, filed on Feb. 20, 1998; and "Failover and Failback System for a Direct Access Storage Device," to Brent C. Beardsley and Michael T. Benhase, Ser. No. 08/988,887, filed on Dec. 11, 1997, both of which applications are incorporated herein by reference in their entirety.

Set Subsystems Characteristics Command

Preferred embodiments include a command, referred to herein as the "Set Subsystems Characteristics" command, which the host system 16 issues to inform the storage controller 18 of the capabilities of the host system 16. In preferred embodiments, the host 16 may issue the Perform Subsystem Function which includes in a byte field the Set Subsystems Characteristic command indicating the capabilities of the host 16. In preferred embodiments, the Set Subsystems Characteristics command cannot be issued until path group IDs are provided to the subchannels 35. The Set Subsystems Characteristics command may be used when there are multiple paths or only a single path between a subchannel 32a, b, c and an I/O device 26a, b, c.

The storage controller 18 maintains a systems characteristic data structure including information on the capabilities of the host 16 and storage controller 18. This data structure may be a bitmap, wherein each field in the bitmap relates to a particular function or operation capability. The systems characteristic bitmap would include an addressable location for different capabilities and features available in the storage controller. Certain fields in the system characteristics data structure may be left blank for space as future system capabilities are developed. The storage controller 18 would activate a particular function by setting an addressable bitmap location to "on" upon receiving indication from the Set Subsystems Characteristic command that the host 16 includes the capability of the particular function or operation. In preferred embodiments, the storage controller 18 maintains the systems characteristic data structure for the path group including the path on which the Set Subsystems Characteristic command was received. Thus, a systems characteristic data structure may be maintained for each path group to define the system capabilities for devices, i.e., the host 16 and I/O devices 26a, b, c, on the path group. The systems characteristics data structure is included in a memory area of the storage controller 18.

The storage controller 18 may also modify other information upon determining the capabilities of the host 16. For instance, the storage controller 18 may modify the Device Characteristics Information the storage controller 18 provides to the host 16 in response to receiving the Read Device Characteristics command. In the IBM 3990 Storage Controller, the Device Characteristics Information indicates for a particular path group ID and device associated therewith information on the storage controller, storage capacity, and capabilities of the I/O device 26a, b, c associated with the path group ID.

The storage controller 18 may also indicate certain information concerning system characteristics maintained in the data structure in Configuration Data Records (CDR) indicating the addressing, status, and control information for an I/O device 26a, b, c. In preferred embodiments, there is one CDR per channel path to an I/O device 26a, b, c. The storage controller 18 provides the host a CDR record in response to receiving a Read Configuration Data (RCD) command. During initialization, the host 16 issues the RCD commands to obtain the CDR data from the storage controller 18 for each subchannel 32a, b, c. The host 16 obtains information on the configuration of the I/O devices 26a, b, c, such as the storage capacity, logical volumes, and addressing capabilities by issuing a Read Configuration Data (RCD) command to an I/O device 26a, b, c. In response, the storage controller 18 provides Configuration Data Records (CDR) indicating the addressing, status, and control information for the device. Further description of the Device Characteristics Information and CDRs is described in IBM document "Storage Subsystem Library: IBM 3990 Storage Control Reference," IBM document no. GA32-0099-06, which publication was incorporated herein by reference above.

Thus, the storage controller 18 may maintain system capability information in the systems characteristics bitmap data structure and then update other records and information provided to the hosts 16 with information on host 16 system capabilities maintained within the systems characteristic data structure.

Figure 3:
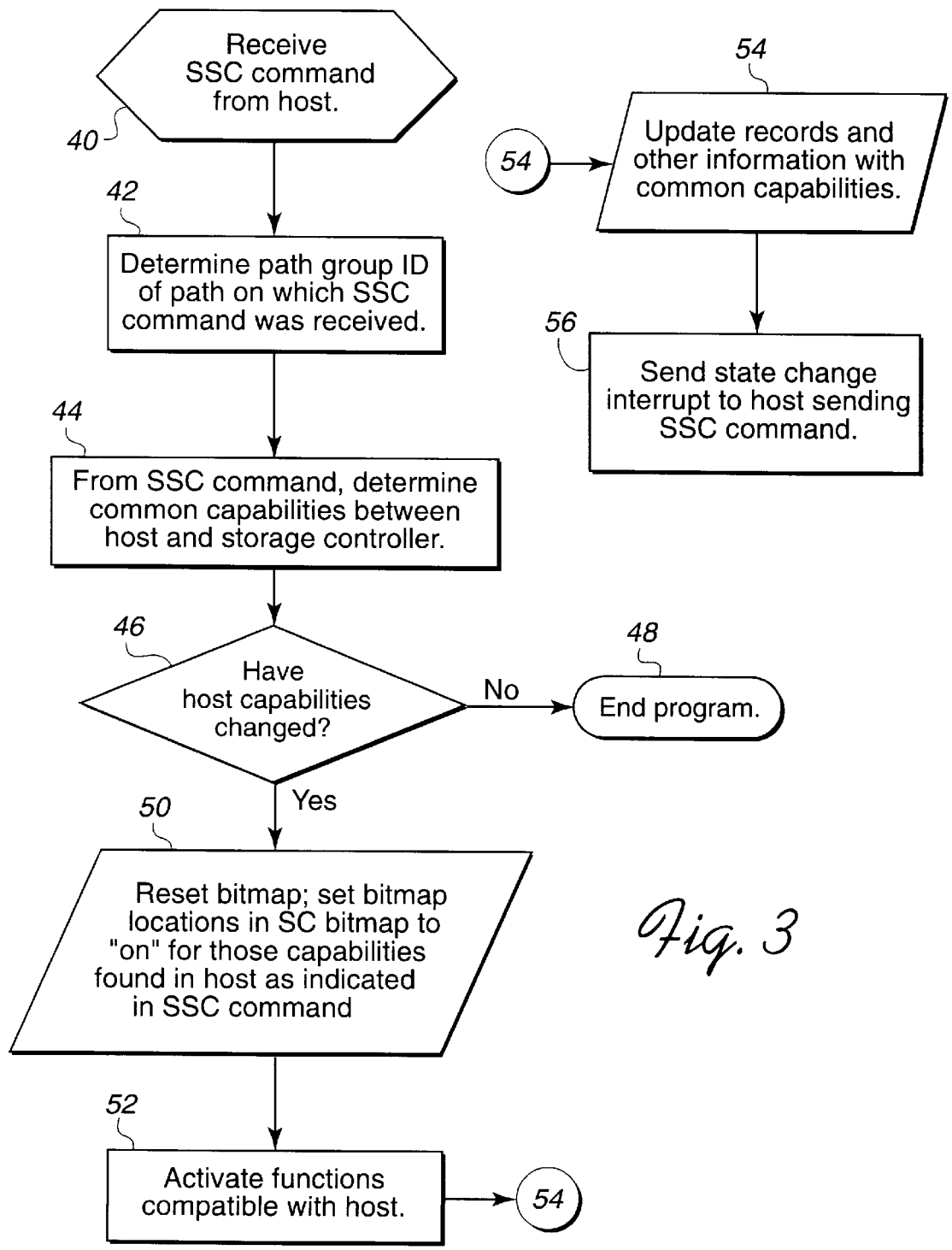
FIG. 3 illustrates logic for processing a command indicating system capabilities in accordance with preferred embodiments of the present invention.

FIG. 3 illustrates control logic implemented in the storage controller 18 to process a Set Subsystems Characteristics command from the host 16. Control begins at block 40 which represents the storage controller 18 receiving a Set Subsystem Characteristics (SSC) command from a host 16. Control transfers to block 42 which represents the storage controller 18 determining the path group ID of the path on which the SSC command was received. The storage controller 18 would then know which host 16 initiated the SSC command from the path group ID. Control transfers to block 44 which represents the storage controller 18 determining the common capabilities of the host 16 indicated in the SSC command that are also available in the storage controller 8. The storage controller 18 may compare the capabilities indicated in the SSC command with the storage controller 18 capabilities indicated in the addressable location of the systems characteristics bitmap.

Control then transfers to block 46 where the storage controller 18 determines whether the capabilities of the host 16 have changed. The storage controller 18 may determine whether capabilities have changed by comparing the capabilities indicated in the Set Subsystem Characteristics (SSC) command and the previous settings maintained in the system characteristics data structure. i.e., those bitmap locations that are "on." If the settings in the bitmap do not match the capabilities in the SSC command, then the host 16 is providing changed system capabilities through the SSC command If there is a change in host 16 capabilities, then control transfers to block 50 which represents the storage controller 18 resetting the system characteristics bitmap addressable locations to "off" and then setting the bitmap locations in the bitmap to "on" for those common capabilities between the host 16 and storage controller 18.

Control transfers to block 52 which represents the storage controller 18 activating the common capabilities. The common capabilities may be activated by indicating those common capabilities as "on" in the system characteristics (SC) bitmap. Control transfers to block 54 where the storage controller 18 updates records and other information which indicates the common capabilities, such as the device characteristics information and the CDR records. Control then transfers to block 56 where the storage controller 18 generates a device state transition unsolicited interrupt to the host 16 that initiated the Set Subsystems Characteristics (SSC) command indicating a change in system settings. As discussed, the storage controller 18 determines the host 16 initiating the SSC command from the path group ID on which the SSC command was received.

FIG. 4 illustrates logic implemented in the host 16 to process a device state transition interrupt, such as the interrupt generated at block 56 in FIG. 3. Control begins at block 60 where the host 16 receives the device transition interrupt from the storage controller 18 indicating a change in systems settings and relationships. Control then transfers to block 62 where the host 16 generates a Read Configuration Data (RCD) command to read the CDR records indicating various system settings. Control then transfers to block 64 where the host 16 issues a Read Device Characteristics command to receive updated device characteristics information. The host 16 may then use this new information to reinitialize and set settings indicating any new capabilities. Using the CDR and other information to initialize system settings is described in related patent application entitled "Method And System For Dynamically Assigning Addresses To An Input/Output Device, U.S. application Ser. No. 09/167,782 which application was incorporated by reference in its entirety above.

In embodiments where the host 16 includes both a host operating system, e.g., VM, and a guest operating system installed on the host operating system, e.g., MVS, the host operating system may monitor any chain of commands from the guest operating system to the storage controller 18 for a Set Subsystems Characteristics command with the Set Special Intercept. Upon detecting a monitored command, the host operating system may inhibit the command from reaching the storage controller 18 to prevent the guest operating system from reconfiguring the storage controller 18 with the capabilities and features that the host operating system does not support. In this way, if the storage controller 18 is configured to match the capabilities of the host operating system, then the guest operating system cannot reconfigure the storage controller 18 to recognize capabilities in the guest that are not available in the host operating system.

Thus, preferred embodiments provide a mechanism for allowing a host 16 to inform the storage controller 18 of host capabilities to allow the storage controller 18 to activate those common capabilities and functions. In this way, the storage controller 18 will only implement those features and operations that are compatible with the capabilities of the host system 16. The storage controller 18 will not send commands the host operating system is not capable of processing because the storage controller 18 only performs operations that are compatible with the settings initially provided by the host operating system via the Set Subsystems Characteristics command. Thus, the host operating system does not have to monitor for incompatible commands from the storage controller 18. The storage controller 18 would only start issuing incompatible commands upon receiving a Set Subsystems Characteristics command from the guest operating system. However, the host operating system will use the Set Special Interrupt condition to monitor a transmission of the SSC command from the guest operating system to prevent a guest from issuing an SSC command to reconfigure the storage controller 18 to include capabilities beyond those of the host operating system. With the preferred SSC command, the host operating system need only monitor for the SSC command and does not have to monitor or intercept any other incompatible commands that may be sent between the guest operating system and the storage controller 18.

Preferred embodiments are more efficient and conserve processor cycles by reducing the number of incompatible commands the host operating system must monitor to only the SSC command. If the host operating system intercepts SSC commands from the guest operating system, then the guest operating system cannot activate functions and capabilities in the storage controller 18 that are not available to the host operating system.

With the preferred embodiments, capabilities remain compatible between a host 16 and a storage controller 18, and among a host operating system, guest operating system, and storage controller 18.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as implemented in a mainframe operating system, such as the IBM S/390 system, and the IBM 3990 Storage Controller. The host 16 may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the storage controller 18.

Preferred embodiments were described with respect to a host system that communicates with a channel subsystem, which in turn communicates via channel paths to a storage controller, which accesses the I/O devices. In alternative embodiments, the data paths may extend from the channel subsystem directly to the I/O device or, alternatively, from the host system directly to the I/O device without the intervention of the channel subsystem and subchannel constructs. Moreover, in alternative embodiments, the host system and storage controller may be any processing unit types that communicate and transfer data therebetween.

In summary, preferred embodiments in accordance with the present invention provide a method and system for indicating system capabilities. A first processing unit receives a command from a second processing unit indicating capabilities of the first processing unit. The first processing unit determines common capabilities indicated in the command that are also available in the first processing unit and indicates in a data structure the common capabilities. The first processing unit then signals the second processing unit.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for indicating system capabilities and for communicating with a processing unit, comprising:
   a control unit in communication with the processing unit;
   a memory area accessible to the control unit including information indicating system capabilities of the control unit;
   control logic executed by the control unit, comprising:
      (i) means for receiving a command from the processing unit indicating capabilities of the first processing unit;
      (ii) means for processing the information indicating capabilities of the control unit and the command indicating capabilities of the first processing unit to determine common capabilities that are available in the processing unit and control unit;
      (iii) means for indicating in a data structure the common capabilities;
      (iv) means for signaling the processing unit;
      (v) means for receiving a request from the processing unit for configuration information sent in response to the signal; and
      (vi) means for transmitting the data structure indicating the common capabilities to the second processing unit in response to the request to provide the processing unit information on the common capabilities.

2. The system of claim 1, wherein the control unit is in communication with a plurality of processing units, and wherein the control logic further comprises:
   means for determining a channel path on which the command was transmitted;
   means for determining a path group identifier associated with the determined channel path; and
   means for determining the processing unit associated with the determined path group identifier, wherein the means for signaling the processing unit comprises signaling the determined processing unit.

3. The system of claim 2, wherein the data structure is maintained for the path group and associated processing unit.

4. The system of claim 1, wherein the data structure is a bitmap data structure, wherein addressable locations in the bitmap data structure indicate system capabilities, and wherein the means for indicating in the data structure the common capabilities comprises means for indicating as "on" the addressable locations in the bitmap data structure that correspond to the common capabilities.

5. The system of claim 1, wherein the control logic further comprises means for updating information indicating the determined common capabilities.

6. The system of claim 1, wherein the means for signaling the second processing unit comprises transmitting a state transition interrupt to the processing unit indicating a change in system settings.

7. A method for indicating system capabilities in a first processing unit in communication with a second processing unit comprising:
   receiving, with the first processing unit, a command from the second processing unit indicating capabilities of the first processing unit;
   determining, with the first processing unit, common capabilities indicated in the command that are also available in the first processing unit;
   indicating in a data structure, with the first processing unit, the common capabilities;
   signaling, with the first processing unit, the second processing unit;
   receiving, with the first processing unit, a request from the second processing unit for configuration information in response to the signal from the first processing unit; and
   transmitting, with the first processing unit, the data structure indicating the common capabilities to the second processing unit in response to the request to provide the second processing unit information on the common capabilities.

8. The method of claim 1, wherein the first processing unit is a control unit and the second processing unit is a computer system.

9. The method of claim 8, wherein there are a plurality of computer systems in communication with the control unit, wherein the step of receiving the command from the second processing unit further comprises the steps of:
   determining a channel path on which the command was transmitted;
   determining a path group identifier associated with the determined channel path; and
   determining the computer system associated with the determined path group identifier, wherein the step of signaling the second processing unit comprises signaling the determined computer system.

10. The method of claim 9, wherein the data structure is maintained for the path group and associated computer system.

11. The method of claim 1, wherein the data structure is a bitmap data structure, wherein addressable locations in the bitmap data structure indicate system capabilities, and wherein the step of indicating in the data structure the common capabilities comprises the first processing unit indicating as "on" the addressable locations in the bitmap data structure that correspond to the common capabilities.

12. The method of claim 1, wherein the first processing unit updates information indicating the determined common capabilities.

13. The method of claim 1, wherein the step of signaling the second processing unit comprises transmitting a state transition interrupt to the second processing unit indicating a change in system settings.

14. A method for monitoring system activity, comprising:
   executing a guest operating system within a host operating system;
   transmitting with the guest operating system a command to a control unit, wherein the command is capable of comprising a set characteristics command indicating system capabilities of the guest operating system;
   determining, with the host operating system, whether a transmission from the guest operating system is the set characteristics command indicating system capabilities; and
   inhibiting the command transmitted from the guest operating system from reaching the control unit if the command is the set characteristics command to prevent the guest operating from reconfiguring the control unit to recognize capabilities in the guest operating system that are not available in the host operating system; and allowing the command transmitted from the guest operating system to reach the control unit if the command is not the set characteristics command.

15. The method of claim 14, further comprising:

maintaining with the control unit a record indicating common capabilities between the host operating system and the control unit;

receiving, with the control unit, a command from the guest operating system;

determining, with the control unit, whether the received command is within the common capabilities between the host operating system and control unit;

executing with the control unit the received command if the received command is within the common capabilities;

rejecting with the control unit the received command if the command is not within the common capabilities.

16. A system for monitoring system activity and for communicating with a control unit, comprising:

means for executing a guest operating system within a host operating system;

means for transmitting with the guest operating system a command to the control unit, wherein the command is capable of comprising a set characteristics command indicating system capabilities of the guest operating system;

means for determining, with the host operating system, whether a command transmitted from the guest operating system is the set characteristics command indicating system capabilities; and means for inhibiting the command from reaching the control unit if the command is the set characteristics command to prevent the guest operating from reconfiguring the control unit to recognize capabilities in the guest operating system that are not available in the host operating system; and allowing the command transmitted from the guest operating system to reach the control unit if the command is not the set characteristics command.

17. The system of claim 16, further comprising:

means for maintaining with the control unit a record indicating common capabilities between the host operating system and the control unit;

means for receiving, with the control unit, a command from the guest operating system;

means for determining, with the control unit, whether the received command is within the common capabilities between the host operating system and control unit;

means for executing the received command if the received command is within the common capabilities;

means for rejecting the received command if the command is not within the common capabilities.

18. A memory device storing information accessible to a control unit indicating system capabilities of the control unit, wherein the control unit receives a command from a processing unit indicating capabilities of the processing unit, wherein the control unit processes the information indicating capabilities of the control unit and the command indicating capabilities of the first processing unit to determine common capabilities that are available in the processing unit and control unit, wherein the control unit indicates in the data structure the common capabilities and signals the second processing unit, wherein the data structure is transmitted to the second processing unit in response to receiving a request from the second processing unit for information on the common capabilities.

19. The memory device of claim 18, wherein the data structure is a bitmap data structure, wherein addressable locations in the bitmap data structure indicate system capabilities, and wherein the control unit indicates the common capabilities by indicating as "on" the addressable locations in the bitmap data structure that correspond to the common capabilities.

20. A method for obtaining with a first processing unit systems setting information indicating system capabilities from a second precessing unit via a communication line, comprising:

transmitting, with the first processing unit, a first command indicating system capabilities to the second processing unit, wherein the second processing unit determines common system capabilities between the first and second processing units;

receiving an interrupt from the second processing unit;

transmitting a second command, with the first processing unit, to the second processing unit requesting system settings; and receiving system settings information from the second processing unit indicating the common system capabilities between the first processing unit and the second processing unit in response to the second command.

21. A system for indicating system capabilities and for communicating with a control unit, comprising:

a processing unit in communication with the control unit;

control logic executed in the processing unit, comprising:

(i) means for transmitting a first command indicating system capabilities to the control unit, wherein the control unit determines common system capabilities between the processing unit and control unit and indicates in a data structure the common capabilities;

(ii) means for receiving an interrupt from the control unit;

(iii) means for transmitting a second command in response to the interrupt to the control unit requesting system settings; and (iv) means for receiving the data structure from the control unit indicating the common system capabilities between the processing unit and the control unit in response to the second command.

* * * * *

UNITED STATES PATENT AND TRADEMARK OFFICE
CERTIFICATE OF CORRECTION

PATENT NO. : 6,202,095 B1
DATED : March 13, 2001
INVENTOR(S) : Brent Cameron Beardsley et al.

It is certified that error appears in the above-identified patent and that said Letters Patent is hereby corrected as shown below:

Column 11,
Lines 2 and 39, please insert -- system -- after "guest operating"

Column 12,
Line 24, please delete "precessing" and insert -- processing -- therefore Signed and Sealed this Twenty-seventh Day of July, 2004

JON W. DUDAS
*Acting Director of the United States Patent and Trademark Office*